8858X
A & S Chichester.
Blocking & Stretching Hats.
Patented May 29, 1835.
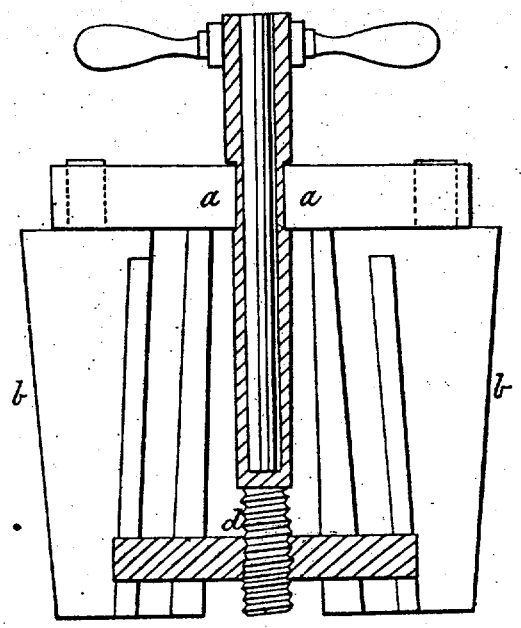
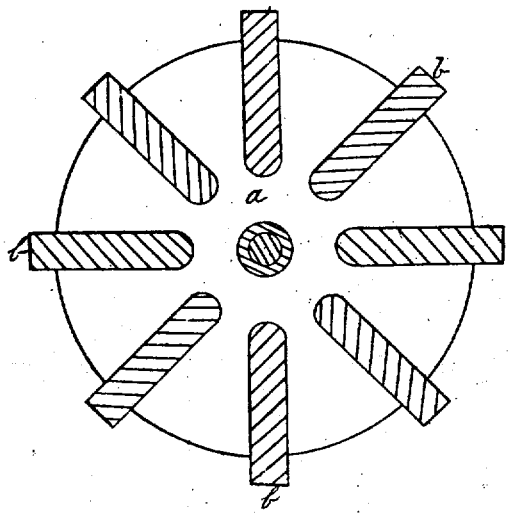
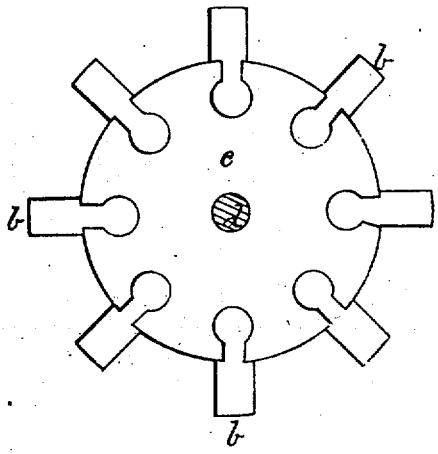

No 15

8858X                May 29. 1835                285.

Aaron Chichester & Samuel Chichester, of Wilton, Conn:
Letters Patent

The schedule referred to in these Letters Patent and making part of the same containing a description in the words of the said Aaron Chichester and Samuel Chichester themselves of their improvmt in the Hat block or machine which to color hats.

To all to whom these presents shall come: Be it known that we Aaron and Samuel Chichester both of Wilton, Fairfield County and State of Connecticut, have invented a new and useful machine for coloring hats, and the following is a full and exact description thereof. The machine above alluded to we will call the dilating and contracting hat block.
It is called a hat block, yet it differs from the common block, in that it is open in its construction, being composed of parts which are set asunder so as to differ from the block so called from its being solid - It differs also from all other open blocks heretofore invented, and especially in that it is capable of being dilated after it is contracted and entered into the hat, so as to cause it to set close or tight. This is effected by means of a screw passing through the centre of two circular plates as hereinafter described.
First plate or head piece - This is called a head piece, as it comes (when the hat is blocked for coloring) next the head or band, or it is encircled by the band, and is fixed, or stationary; ie in respect to its counter parts. This plate may be composed of iron, copper, or brass, or some other metal. possibly some kinds of wood may do as a substitute. we would prefer some kind of metal. copper endure the corrosive properties of the dies, but cast iron is much cheaper. The diameter of this plate may be varied so as to suit the different sizes of hats, while the proportion is to be observed between this and its counter plate. This stationary plate is perforated with a number of mortice holes say eight or ten, eight will do generally. These mortice holes are about half an inch square - these holes are placed near the margin of the sd plate for the purpose of receiving a like number of wood in leaves which project by a shoulder from one half to three fourths of an inch further out, than the plate does, so as to fill a hat of a diameter much greater than

8858X the plate. These leaves have one edge standing outward to reach the hat and the other inward towards the center, and approaching as near the center as they may and not interfere with the screw. The leaves are wider at the end where or by which they are received into this plate by about one third than at their other end, by which they enter the counter plate or tip piece. They are about one half of an inch thick, from about two, to two and a half wide, their length accords to the hat that is to receive them, the smaller or narrower end is received into the counter plate or tip piece or movable plate. This plate is of a lesser diameter than the fixed plate about one fourth. It receives the wooden bars by a like number of indentations around the border of said plate which are so formed as to receive the plate by a cylindrical bed, made on the inner edge of said barrs: we may best give a proper notion of the indentures afores^d, by supposing this plate to be of wood, lay it in a horizontal position take a half inch bit and bore through it about half an inch within the circle or border of said plate, then set in a verticle position and saw a gap from the border inward to the hole first made.

The gap should be about one third less in width than the diameter of the hole first bor'd, so as to clasp the bed which traverses in the round hole so as to admit the movable plate to be drawn near to the stationary one.

It is necessary that this plate be made of some metal that is not easily corroded, copper or brass will do very well, as it is to receive the screw aforesaid by a receiving screw. It is necessary that the material be good. The screw may be a solid piece of metal, as iron or brass or copper running through the block and turned either by a crank, or a cross pin, in which case one screw may answer an indefinite number of blocks. or it may be hollow or tubular at the outer end as far as about two thirds of its length, the other third (the inner end solid) to operate on the moveable plate as afs^d. and also to receive the pin of the coloring wheel, then and in this case there must be a screw to each several block, the solid part only has a screw cut on it. This screw has a square form at its outer end to receive a wrench by which it is turned. As this machine is altogether new we humbly conceive that no particular part is to be pointed out as original as distinct from the other parts. We therefore submit it as it stands, with all due defference Witnesses. Asahel Dudley. James H. Chapman. E Aaron Chichester
Samuel Chichester